United States Patent [19]

Marocco

[11] 4,177,789
[45] Dec. 11, 1979

[54] METHOD FOR THE PRODUCTION OF SLABS OF MARBLE OR SIMILAR STONY MATERIAL

[76] Inventor: Giuseppe Marocco, Corso Galileo Ferraris 18, Turin, Italy

[21] Appl. No.: 930,118

[22] Filed: Aug. 1, 1978

[30] Foreign Application Priority Data

Aug. 3, 1977 [IT] Italy .............................. 68796 A/77

[51] Int. Cl.² .............................................. B28D 1/00
[52] U.S. Cl. ..................................... 125/1; 51/283 R; 125/12; 125/16 R
[58] Field of Search ............... 125/1, 12, 13 R, 13 SS, 125/14, 16 R; 51/283 R

[56] References Cited

U.S. PATENT DOCUMENTS

| | | | |
|---|---|---|---|
| 1,349,955 | 8/1920 | Harwood | 125/12 |
| 2,412,644 | 12/1946 | Müller | 125/12 |
| 2,691,858 | 10/1954 | Andras | 125/13 R |

FOREIGN PATENT DOCUMENTS

1148932  5/1963  Fed. Rep. of Germany ............ 125/12

*Primary Examiner*—Harold D. Whitehead
*Attorney, Agent, or Firm*—Sughrue, Rothwell, Mion, Zinn and Macpeak

[57] ABSTRACT

Thin sections of marble or like stone are made by sawing of a block to produce preliminary slabs which are held together, either by integral bridging portions, bonded base portions, or external shoring, while a spacer material, for example resin, is introduced into the clefts between the slabs. A second sawing operation then divides each slab into two halves, which can be ground and polished before separation.

30 Claims, 23 Drawing Figures

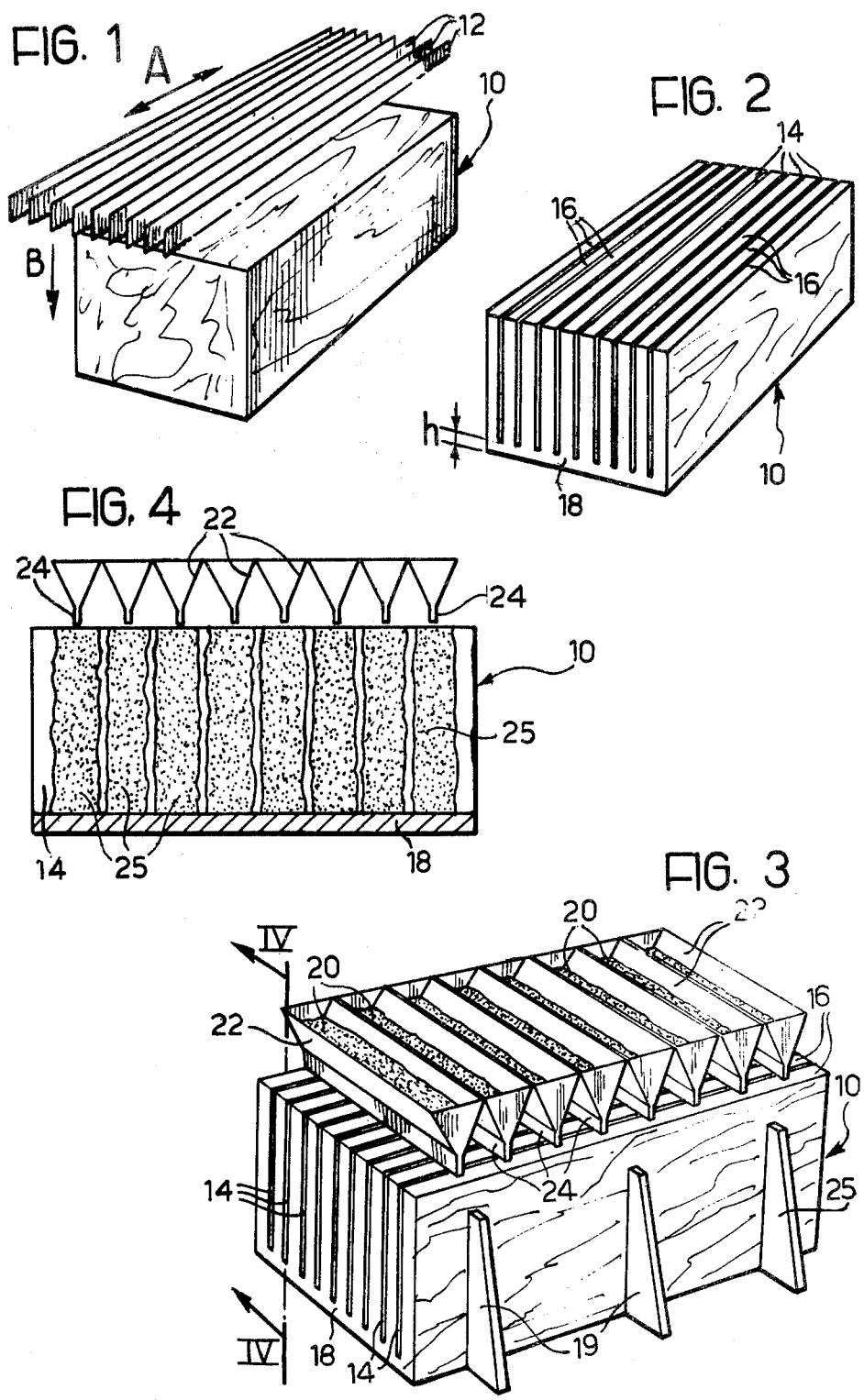

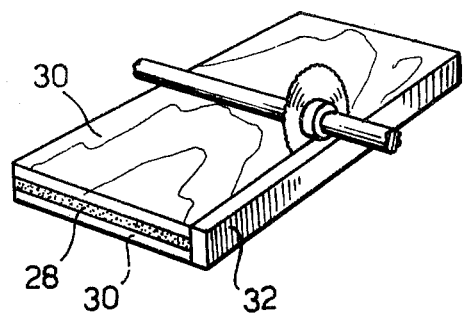
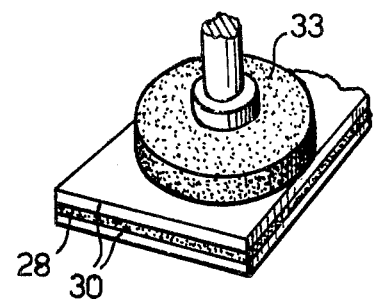
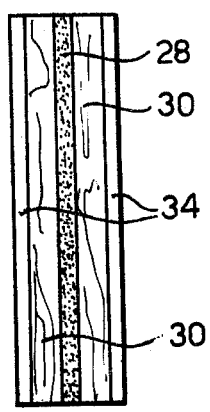
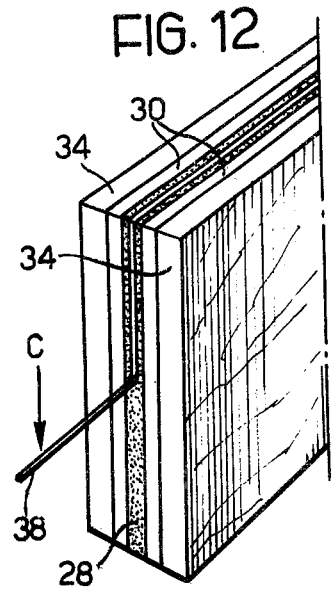
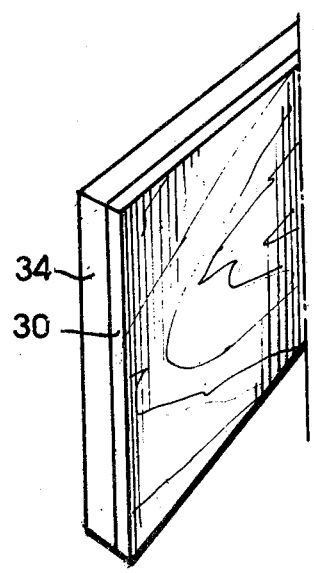

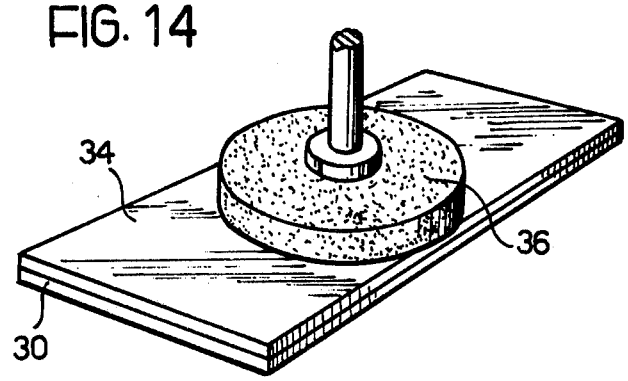
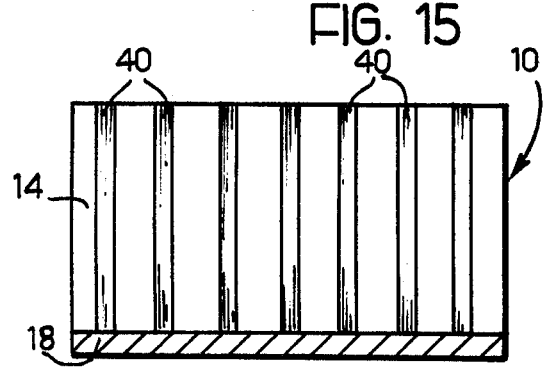
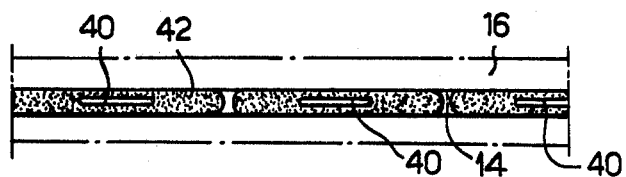
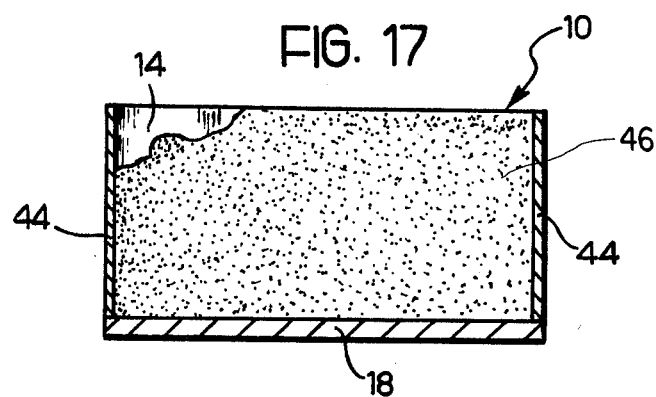

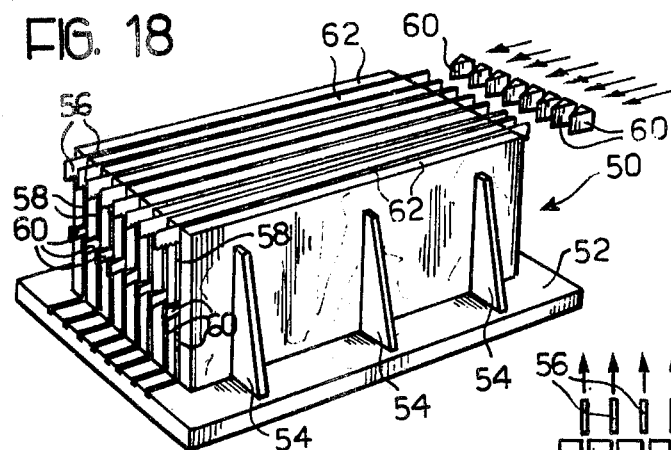
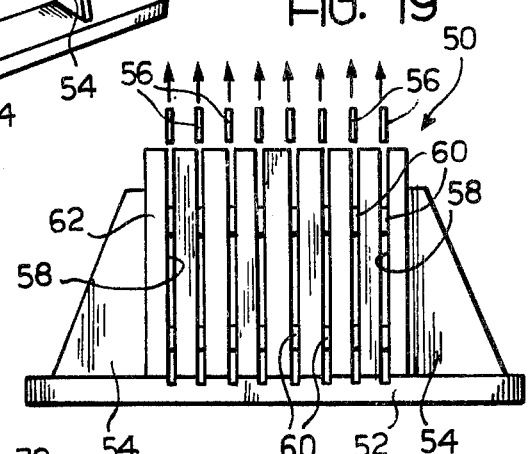
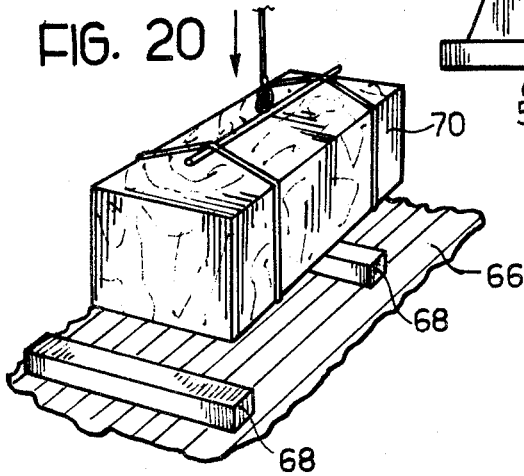
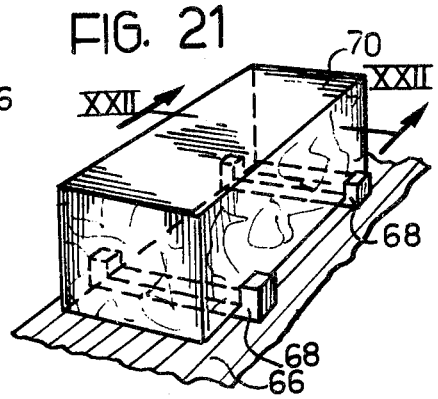
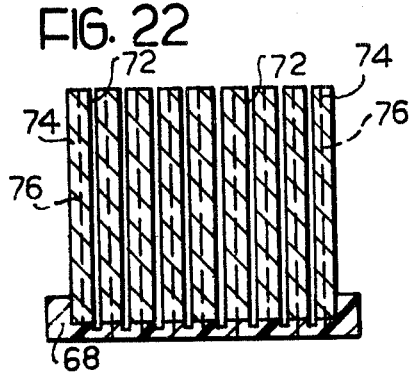
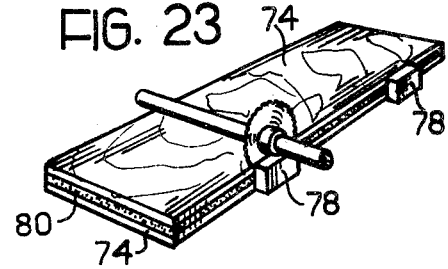

METHOD FOR THE PRODUCTION OF SLABS OF MARBLE OR SIMILAR STONY MATERIAL

The present invention relates to a method for manufacturing slabs by sawing a block of marble, granite, or similar rock by means of a multiple blade saw frame.

Frames with multiple reciprocating blades are commonly used for cutting or sawing blocks of natural marble, granite, or other rock into slabs as well as for cutting blocks of composite material made of stone chippings bound together by a binder material. Such frames may have steel blades, in which case the cutting zone is supplied with water containing in suspension siliceous sand, metal particles or other abrasive particles. For the cutting of marble blades incorporating diamond chips are used, water being fed to the cutting zone for the purpose of lubricating and cooling the cutting zone and carrying away the material removed. Two types of diamond blade frames are available on the market having either horizontal or vertical blades.

The minimum thickness of slab which can be produced by cutting or sawing using multiple blade frames is determined by the dimensions of the blade attachment and tensioning means. Since each blade has to be maintained under high tension (about 6-8 tonnes for a blade about 3 meters long), such means necessarily have considerable dimensions. Consequently, the minimum thickness of the slabs which can be cut from rock with multiple blade frames of standard dimensions is about 15 mm, and the great majority of marble slabs produced in this way have a thickness of 2 cm or more.

Thinner slabs can be made, using diamond cutting or sawing discs. By such means, however, it is not possible to make slabs of any considerable dimensions, since the discs must have a diameter at least equal to twice the height of the block to be cut, plus the diameter of any flanges or hubs on the discs for connection to a drive shaft. In practice, the diamond discs must have a diameter of about three times the height of the block to be cut. Furthermore, the greater the cutting disc diameter the greater the thickness of the cutting disc and the greater the loss of material during sawing, increasing the difficulty of the sawing operation.

The cutting of blocks with diamond discs requires, moreover, considerable power, large machines and very costly tools, so that sawing with multiple discs turns out to be uneconomical for depths of cut above 40-50 cm.

It should be noted that marble specifically is a natural material which normally has internal faults, and the more beautiful marbles, endowed with colour and veinings, are usually the most defective due to their broken geological formation. It therefore follows that, independently of the technical limitations imposed by multiple blade frames and by diamond disc cutters, it is practically impossible to manufacture slabs of most materials below a certain thickness, since the amount of material rejected in the machine shop would be unacceptable. Even the sawing of slabs of "normal" thickness of from 2 cm to 4 cm from many materials, in the present state of technology, results in many rejects, and may prove to be impossible.

Because of the intrinsic limitations of the basic material, and of the known cutting and sawing systems, the cutting of slabs from marble and other rock is costly, due to the large amount of reject material, the large amount of waste material arising from the thickness of the slabs and the cost of transport of the material due to the very considerable weight of the slabs. The weight and fragility of the slabs prevent their use in many building applications, especially in industrial practice.

Thus with present-day methods it is not possible to make thin slabs (less than 1 cm thickness) of marble or other rock or slabs of large surface area (from 2 to 4 square meters), which would be desirable in order to reduce costs both of manufacture and of transportation and use. Indeed, in the case of fragile or faulty marble it is not possible to make slabs of the standard thickness of 2 to 4 cm.

The main object of the present invention is to provide a method of the kind referred to by means of which slabs of marble or similar rock can be made with a large surface area and with a thickness of a few millimeters, and by means of which very faulty material can be sawn using a multiple blade saw frame.

According to the present invention there is provided a method for the manufacture of slabs by sawing a block of marble, granite or like material by means of a multiple-blade frame, characterised in that the method comprises the following steps:

(a) subjecting a monolithic block to a first sawing operation by means of a multiple saw frame to form a series of preliminary slabs parallel to each other, (b) keeping the preliminary slabs joined together at least at one of their edges to maintain them in fixed relative positions, said preliminary slabs being separated by clefts made by the first sawing operation;

(c) introducing a spacer material into the clefts, thus producing a composite block formed by the preliminary slabs and said spacer material, and (d) subjecting the said composite block to a second sawing operation along intermediate planes of the preliminary slabs, so as to sub-divide each preliminary slab into two final slabs.

By the method according to the invention it is possible to produce preliminary slabs of standard thickness of the order of 2 cm. Subsequent filling of clefts prevents breakage of the preliminary slabs in the course of the second sawing, which can be carried out along the median intermediate planes of the preliminary slabs, so as to split them in halves along their thickness. By sawing the blocks using blades about 5 mm thick, it is possible to produce, ultimately, slabs of about 0.75 mm thickness.

Preferably before the second sawing, filler material is inserted into each cleft so as to fill it at least at intervals throughout its entire extent, after which the filler is made, or allowed, to harden. The hardened filler then constitutes the aforesaid spacer material. The filler material should, preferably, have good binding qualities relative to stone.

With the help of this method it is possible to use the finished pairs of slabs to make various "sandwich" structures in the form of stratified elements comprising two outer slabs of stone and an intermediate bonding core. The processes for making such structures may consist of cutting the slabs into elements of a smaller surface area, so that grinding to size, polishing and other finishing operations are carried out upon slabs which are thicker in relation to their surface area, and therefore much stronger. Thus the finished slabs can be stored and transported in the "sandwich" state without suffering damage. Finished slabs of faulty material can be given a stucco finish and reinforced without difficulty before removal of the intermediate bonding core.

The invention will be further described, by way of non-limiting example, with reference to the accompanying diagrammatic drawings, in which:

FIG. 1 is a perspective view of a block of marble, granite or like natural stone which is just about to undergo its first sawing according to a preferred embodiment of the method of this invention;

FIG. 2 is a similar perspective view of the block after its first sawing;

FIG. 3 is a perspective view of the said block whilst it is undergoing pouring of an expansible resin into the clefts made in the first sawing;

FIG. 4 is a section taken along the vertical plane indicated by the line IV—IV in FIG. 3, which shows the method by which the resin is poured into a cleft;

FIG. 9 is a perspective view illustrating the pair of slabs of FIG. 8 while they are undergoing trimming;

FIG. 10 is a perspective view illustrating the said pair of slabs shown in FIG. 9 whilst they are undergoing polishing;

FIG. 11 is an end view of the pair of slabs after trimming and after a pair of reinforcing or like layers have been applied to the outer surfaces of the two slabs;

FIG. 12 is a partial perspective view showing the said pair of slabs during an operation for separation of the slabs;

FIG. 13 is a partial perspective view of a finished slab, with one layer of reinforcement or the like;

FIG. 14 is a perspective view of the slab of FIG. 13 undergoing grinding;

FIG. 15 is a section similar to that of FIG. 4, illustrating a variant of the stage where the expansible resin is introduced into a cleft;

FIG. 16 is a partial plan view from above, similar to FIG. 5, illustrating the resin in its expanded state in a cleft;

FIG. 17 is also a section similar to those of FIGS. 4 and 14, illustrating a variant of the cleft filling stage;

FIG. 18 is a perspective view of a block undergoing its first sawing, according to another embodiment of the method of this invention;

FIG. 19 is a view of the block shown in FIG. 18 from one end, at the end of its first sawing;

FIGS. 20 and 21 show in perspective the first two stages of a method according to yet another embodiment of the invention, in which a rough block to be cut is placed upon transverse supports of binder material;

FIG. 22 is a cross-section taken along the line XXII—XXII in FIG. 21, in which the block is shown after its first sawing, and FIG. 23 is a perspective view, similar to that of FIG. 9, illustrating a pair of slabs made from the block shown in FIGS. 20 and 22, while undergoing trimming.

Figure 6:
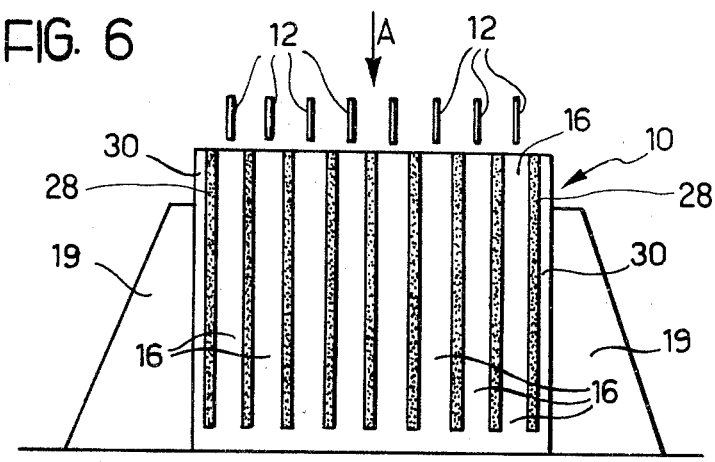
FIG. 6 is a view of the block from one end, just about to undergo a second sawing according to the method of the invention.

In the drawings, which are not to scale, the relative dimensions of the slabs and the clefts have been changed, in the interests of clarity.

FIG. 1 illustrates a block 10 which can be of marble, granite, or like hard rock, but which can also be a composite block made of chippings or pieces of one or more stone materials bound together by a binder. The block 10 can measure, for example, 3 m long, 1 meter high and 1.5 meters wide.

The block 10 is subjected to a first sawing operation in its longitudinal direction, by means of a multiple blade frame of the horizontal kind, having saw blades 12 extending horizontally. The blades 12 are reciprocated along their length, as indicated by the double-headed arrow A, in respective vertical cutting planes.

The blades 12 are moved in the direction of the arrow B relative to the block 10 by a feed mechanism (not shown). The 'pitch' distance between adjacent blades 12 can be, for example, about 2 cm.

As shown in FIG. 2, in the first sawing operation several vertical incisions or clefts 14 are made in the block 10, each of these corresponding to one of the blades 12. The blades 12 are made to descend through the block 10, stopping short of the bottom face of the block at a height h of about 2–5 cm from said bottom face. In this way, a semi-finished block is made consisting of a series of preliminary parallel slabs 16, separated by the clefts 14 and joined together, adjacent the bottom face of the block 10, by the unsawn bottom portion 18 of the said block.

If the blades 12 are 5 mm thick, then the clefts 14 will each have a width slightly larger than 5 mm.

Subsequently, as shown in FIG. 3, the semi-finished block 10 is subjected to an operation in which an expansible liquid resin, preferably having good binding qualities in relation to stone, is poured into the clefts 14. The preferred resins are polyurethanes.

The pouring of the resin into the clefts 14 is preferably effected while the block 10 is set up on a frame, after the blades 12 have been extracted from the clefts 14 and withdrawn. The sides of the block 10 can be shored, as shown at 19 in FIGS. 3 and 6, so as to resist the lateral thrust of the resin when this expands.

In its liquid state the resin 20 is contained in a series of hoppers 22 with pouring funnels 24 which are narrow and which extend transversely of the block 10. The series of hoppers 22 and funnels 24 extends substantially over the entire length of the block 10, and the funnels 24 extend substantially over the whole width of the said block 10, as shown in FIG. 3.

As shown in FIG. 4, the resin 20 in its liquid state is poured through the funnels 24 on to the upper surface of the semi-finished block 10 at a delivery rate such that it will flow downwards along the faces of the preliminary slabs 16 bounding the clefts 14, forming, as shown in FIG. 4, a series of vertical strips 25, spaced apart. Moreover, the amount of resin 20 poured in is such an amount that, while it is in the liquid state the strips 25 which are on the opposite surfaces of each cleft 14 do not touch one another.

Figure 5:
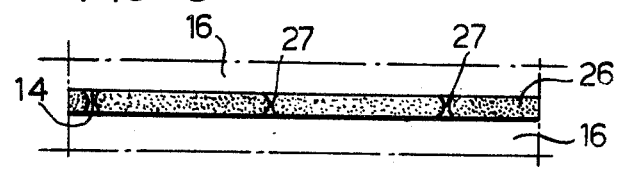
FIG. 5 is a partial view of the block from above, on an enlarged scale, showing the resin expanded in one of the clefts.

The resin of the strips 25 is then caused or allowed to expand and harden. The amount of resin in the strips 25, and the spacing of these strips, must be such that after expansion of the resin the strips 25 opposite each other in each cleft 14 will bond together. The expansion occurs in the longitudinal direction of the clefts 14, but the quantity of resin must be such that, as shown in FIG. 5, the subsequently formed strips 26 of expanded resin material are separated by small spaces 27, that is, not bonded together. In this way the expansion of the resin is prevented from causing excessive stresses in the transverse direction perpendicular to the faces of the slabs 16.

One thus produces a composite block in which the preliminary slabs 16 are effectively bonded together by the spacer material consisting of the expanded resin in the clefts 14. The resulting composite block, still shown as 10 in FIG. 6, will consist of successive layers formed by the preliminary slabs 16 and the layers of spacer material 28.

Figure 7:
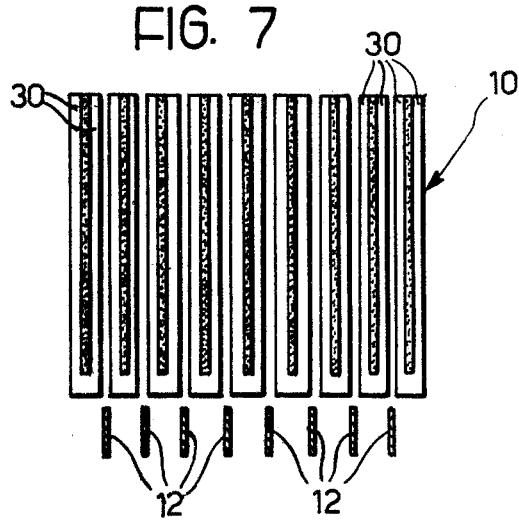
FIG. 7 is a view of the block from the end, similar to FIG. 6, illustrating the condition of the block after the second sawing.

As shown in FIG. 6, the composite block 10, still positioned below the multiple blade frame, is next displaced laterally relative to the blades 12 by means of a micrometric movement system (not shown) until the blades 12 are placed in correspondence with predetermined intermediate planes of the preliminary slabs 16. Preferably these intermediate planes should be medial planes, so that upon the next descent of the blades 12 in the direction of the arrow A in a second sawing operation the preliminary slabs 16 will be cut into halves. As shown in FIG. 7, the second sawing operation is carried out over the entire height of the composite block 10, resulting in a number of composite slabs comprising pairs of blocks 30, joined together along their lower edges by integral bridging sections 32 of the fragmented bottom portion 18.

Figure 8:
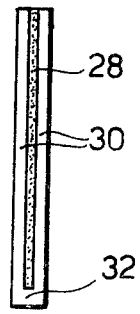
FIG. 8 is an end view of a pair of slabs produced in the second sawing.

One of the composite slabs or "sandwiches," is shown separately in FIG. 8 and comprises two slabs 30 and a central core layer of expanded resin 28.

Using blades 12 of 5 mm thickness to halve preliminary slabs 16 of about 2 cm thickness, the resulting final slabs 30 will have a thickness equal to or less than 0.75 cm, that is, much thinner than the large slabs which could be made by sawing blocks by the traditional method. Starting with preliminary slabs 16 of 1.5 cm thickness, final slabs 30 of 0.5 cms thickness can be made.

The "sandwich" formed by the two slabs 30 joined together by the bridging section 32 and by the interposed core layer 28 of expanded resin can be trimmed along one edge as illustrated in FIG. 9 to remove the bridging section 32. If, as is preferable, the resin has binding qualities in relation to the rock material of the slabs 30, then the slabs 30 will remain firmly united by the core 28 in a "sandwich" structure of considerable strength. It will therefore be possible to subject the bonded pair of slabs, without damaging them, to different finishing operations, such as cutting the slabs into elements of smaller surface area (for example paving tiles), grinding to size, polishing etcetera. The polishing operation is illustrated in FIG. 10, where a grinding wheel 33 is shown for polishing the outer face of one of the slabs 30.

As shown in FIG. 11, it is possible to apply on to the outer faces of the two finished "sandwich" slabs 30, respective surface layers 34 having reinforcing, thermally insulating or sound absorbent properties. The layers 34, if they consist of reinforcing layers, may comprise for example one or more glass fibre layers impregnated with resin or asbestos cement. It is also possible to bond to the slabs 30 surface layers 34 of a stone material stronger and cheaper than that of the slabs 30.

Where the surface layers 34 are required to have thermally insulating and/or sound absorbing qualities, as well as strengthening properties, the layers 34 may consist of a covering of glass fibre, expanded material, or the like.

The bonding of the surface layers 34 can be carried out after the two final slabs 30 have been separated from each other by cutting off or removing the core layer 28, as will be seen later. In any case, the fixing of the layers 34 can be carried out by various methods; for example by adhesive bonding, by joining the two layers 34 to the slabs 30 throughout their thickness by rivets or like fastening means, by combined adhesive and mechanical joints between the layers 34 and the slabs 30, or possibly by interposing a third bonding layer or by applying or injection-moulding a surface layer 34 which has adhesive properties, like the core layer 28.

Finally, it is possible to strengthen the slabs 30, once they have been separated from each other, by mounting them in frames.

As shown in FIG. 12, after, or before, the aforesaid finishing operations separation of the two final slabs 30 is carried out by medial cutting of the resin core layer 28. A suitable method for carrying out this cutting of the core layer 28 utilises a wire 38 electrically heated to a temperature such as to cause melting or disintegration of the resin layer 28. The wire 38, which is maintained in tension, is made to move along the core layer 28 in the direction of the arrow C.

Any residue of the core layer 28 adhering to the two slabs 30 after cutting of the layer can finally be removed when polishing the corresponding face of the slab 30.

The final result of this method is a slab-like element, either of large or small surface area, comprising, as shown in FIG. 13, a "facing" layer consisting of the slab 30 of rock material attached to the layer 34 which acts as a backing.

The slab element shown in FIG. 13 can be ground to size, polished, trimmed or subjected to other finishing operations. Where the slab 30 is of granite, which is difficult and expensive to grind owing to its hardness, it is more expedient to carry out grinding, for example as shown in FIG. 14, using a grinding wheel 39 which acts upon the outer face of the backing layer 34. Polishing will then be effected on the outer face of the granite slab 30.

FIGS. 15 and 16 illustrate a variant of the stage of inserting the expansible resin into the clefts 14. Instead of pouring resin into the clefts 14, support elements of sheet material in the form of strips 40 covered and/or impregnated with a resin composition in its liquid state are introduced into each cleft 14 at intervals. Strips 40 of aluminium of a few centimeters wide and a few tenths of a millimeter thick have proved satisfactory for this purpose, but the use of similar strips 40 of plastics or even of cardboard is not excluded.

Once the strips 40 have been inserted into the clefts 14, the resin composition is caused or allowed to expand, so that in its final expanded state it will form upon the two faces of the supporting elements or strips 40 respective resin layers 42 adhering to the inside faces of the clefts 14, as shown in FIG. 16.

In this case, also, the distance between the strips 40 and the amount of expansible resin composition applied to each strip 40 must be such that in their final expanded state the resin layers 42 on neighbouring pairs of strips 40 will be separate and not bonded together, so as to avoid possible harmful stresses in directions normal to the faces of the preliminary slabs 16.

After the stage shown in FIG. 16, the method according to the invention proceeds as described above.

FIG. 17 illustrates another variant of the operation of introducing a spacer material 46 into the clefts 14. The two end surfaces of the block 10, in which the clefts 14 open, are sealed with plaster of Paris or the like, as shown at 44. The clefts 14 are thus converted into a number of pockets into which a spacer material 46 such as, for example a fluid resin, can be poured and subsequently hardened or polymerised. This resin need not necessarily have bonding properties in relation to stone material. An alternative hardening material which in its fluid state can be used for filling the pockets formed by the clefts 14 is a very weak cement mortar, made with a high sand-to-cement ratio. In fact, the spacer material 46 for filling the clefts 14 may consist of any granular or powdery smooth-running material such as, for example, sand.

In all cases where the spacer material 46 has poor binding or adhesive properties in relation to stone material or in fact has no adhesion at all, as in the case of sand, the use of shorings 19 as shown in FIGS. 3 and 6, or similar means for holding the sides of the block 10, is advisable, if not necessary.

When a spacer material 46 is used which has no adhesion to the stone material, then upon the second sawing operation and trimming of the joined edges of the slabs 30 thin slabs are formed straightaway, which can be provided with backing layers of reinforcement or other material, similar to the layer 34, and then subjected to finishing, or alternatively can undergo finishing operations without any backing layer. Obviously, in this latter case, working on the thin unbacked slabs is more delicate and should be effected in certain cases only when working on very sound stone.

Another embodiment of the method of the invention will be described with reference to FIGS. 18 and 19.

In FIG. 18 a block 50, similar to the block 10 of the previously described embodiments, is placed, beneath a multiple blade saw frame, on a base 52 of sawable material, such as a wooden bench. The side faces of the block 50 are supported by shorings 54, similar to the shorings 19 shown in FIGS. 3 and 6, which are affixed to the base 52.

The block 50 is subjected to first sawing operation by parallel saw blades 56 of the frame, which descend through the block 50 from the top surface of the block. The descent of the blades 56 continues down to a position lower than the bottom surface of the block 50, so that the blades 56 cut into the base 52. Next, the blades 56 are lifted to the position shown in FIG. 18, in which they are once more located in the clefts 58 and the top face of the block 50. With the blades 56 stationary in this position, spacer elements 60 are introduced into the clefts 58. The spacer elements may for example comprise wedges of wood or like material, or blocks of plaster of Paris or like material. The spacer elements 60, in cooperation with the shorings 54, hold the preliminary slabs 62 together, preventing them from moving relative to each other. The saw blades 56 are then lifted further and withdrawn from the sawn block, as shown in FIG. 19.

The method then continues as earlier described, with the introduction of the spacer material into the clefts 58, relative lateral displacement of the block 50 and the saw blade frame, and the second sawing operation. This results in thin slabs on which it is no longer necessary to carry out the trimming operation shown in FIG. 9.

Referring to FIGS. 20 to 23, yet another embodiment of the method according to the invention is illustrated. In this embodiment two cross-pieces 68 of a hardenable binder material in a soft state are formed upon the base 66 of a multiple bladed saw frame similar to that of the previous embodiments. Before the cross-pieces 68 have hardened, a block 70 similar to the blocks 10 and 50 of the previous embodiments is placed upon the cross-pieces 68 (FIG. 20).

After the cross-pieces 68 have hardened (FIG. 21) a monolithic element is formed consisting of the block 70 and of the said cross-pieces 68, in which the bottom of the block 70 has become embedded and thereby firmly anchored to the cross-pieces 68.

In this condition the united block 70 and cross-pieces 68 are subjected to a first sawing operation wholly similar to that of the embodiment of FIGS. 18 and 19, in which the blades of the frame (not shown in FIG. 22) are caused to descend from the top face of the block 70 down to a level below the opposite, bottom, face of the block, until they cut into the cross-pieces 68. This condition is shown in FIG. 22, in which reference numeral 72 indicates the clefts resulting from the first sawing operation which forms preliminary slabs 74. After the first sawing operation the block 70 is in a similar condition to that of the block 10 shown in FIG. 2, with the difference that the preliminary slabs 74 are firmly joined by a bottom portion which consists of the hardened binder material of the cross-pieces 68 as distinct from the integral unsawn portions of the material of the block itself. This hardened binder material has to satisfy various criteria: firstly, it has to have a resistance to sawing no greater than that of the marble or like material of the block 70, and secondly it must have the capacity to bond itself firmly to the material of the block 70. Materials suitable for this purpose are cement aggregates as used in the building industry, and synthetic resins, especially epoxy or polyurethane resins.

The method then proceeds as in the embodiment first described, with the introduction of spacer material 80 into the clefts 72 followed by a second sawing operation which is carried out along the medial planes indicated by the dashed lines 76 in FIG. 22.

At the end of the second sawing operation a "sandwich" (FIG. 23) is produced very similar to that shown in FIG. 9, but in which the bridging portions 78 of the cross-pieces 68 which keep the final slabs 74 joined together consist of the said hardened binder material. FIG. 23 illustrates the final step of removing by sawing the bridging portions 78 from the "sandwich" of the two slabs 74 and the interposed spacer material 80.

I claim:

1. Method for the manufacture of slabs by sawing a block of marble, granite or like material by means of a multiple-blade frame, the said method comprising the following steps:
   (a) subjecting a monolithic block to a first sawing operation by means of a multiple saw frame to form a series of preliminary slabs parallel to each other,
   (b) keeping the preliminary slabs joined together at least at one of their edges to maintain them in fixed relative positions, said preliminary slabs being separated by clefts made by the first sawing operation;
   (c) introducing spacer material into the clefts, thus producing a composite block formed by the preliminary slabs and said spacer material, and
   (d) subjecting the said composite block to a second sawing operation along intermediate planes of the preliminary slabs, so as to sub-divide each preliminary slab into two final slabs.

2. A method as defined in claim 1, wherein the first and second sawing operations are carried out vertically from the top to the bottom of the block by the same multiple blade frame having horizontal saw blades, the second sawing operation being carried out after a relative displacement of the saw blade frame and the block in a lateral direction perpendicular to the cutting planes, so as to place the blades in the said intermediate planes.

3. A method as defined in claim 2, wherein the first sawing operation is carried out to a depth which falls short, by a predetermined distance, of the bottom face of the block, so that the preliminary slabs remain joined together by an unsawn bottom portion of the block.

4. A method as defined in claim 2, wherein the original monolithic block is placed under the multiple blade saw frame upon a base of hardenable binder material in a soft condition, following which this binder material is caused or allowed to harden, the hardened binder material being solidly anchored to the bottom face of the block and being such that in its hardened state it offers a resistance to cutting by the saw blades which is no greater than that offered by the material of the block itself, and wherein the first sawing operation is carried out through the entire depth of the block, cutting into the hardened binder material so that the preliminary slabs remain joined together by unsawn bridging portions of said binder material.

5. A method as defined in claim 4, wherein the base of binder material consists of at least two separate cross-pieces extending in directions normal to the cutting planes.

6. A method as defined in claim 4 or claim 5, wherein the binder material is a cement aggregate.

7. A method as defined in claim 4 or claim 5, wherein the binder material is synthetic resin.

8. A method as defined in claim 2, wherein the original monolithic block is placed under the multiple saw blade frame upon a base of sawable material such as wood, and the outer lateral faces of the block are shored or braced before carrying out the first sawing operation throughout the whole height of the block, so that the saw blades cut into the base after which the blades are lifted into the clefts between the preliminary slabs and, before the withdrawal of the blades from the sawn block, spacer elements are introduced into the end portions of the clefts to brace the preliminary slabs against the lateral shorings, preventing relative shifting of said slabs.

9. A method as defined in claim 8, wherein the spacer elements comprise wedges of wood or like material.

10. A method as defined in claim 8, wherein the spacer elements consist of plaster of Paris or like material.

11. A method as defined in claim 1, wherein before the second sawing operation, a hardenable fluid filler is introduced into each cleft so as to fill the cleft at least at intervals throughout its length, after which the filler material is made or allowed to harden to form the said spacer material.

12. A method as defined in claim 11, wherein the filler material has binding properties in relation to the material of the preliminary slabs.

13. A method as defined in claim 12, wherein the filler material is an expansible resin composition.

14. A method as defined in claim 13, wherein the resin composition is of the polyurethane type.

15. A method as defined in claim 2, wherein, before the second sawing operation a resin composition of the expansible type is poured in a liquid state on to the upper surfaces of the series of preliminary slabs so that the liquid composition flows down into the clefts along the inside faces of the preliminary slabs, the said composition being poured in such quantity that, while it is in the liquid state, it forms discrete layers on the said inside faces, and, in the final expanded state, the layers on the opposite faces of each cleft are bonded together.

16. A method as defined in claim 15, wherein the resin composition is poured into each cleft along vertical strips spaced apart over the length of the said cleft.

17. A method as defined in claim 15, wherein the distance between the neighbouring strips and the width of each strip are such that in the expanded condition the neighbouring strips are spaced from each other.

18. A method as defined in claim 13, wherein support elements of sheet material are covered or impregnated with said expansible resin composition in its liquid state, the support elements being introduced into the clefts, after which the resin composition is caused or allowed to expand so that in its final expanded state it forms on the faces of the support elements respective layers adhering to the inside faces of the clefts.

19. A method as defined in claim 18, wherein the support elements comprise strips which are introduced at intervals into each cleft, the distance between the adjacent strips, and the quantity of expansible resin composition applied to each strip, being such that in the final expanded state the layers of expanded resin composition on neighbouring pairs of strips are spaced from each other.

20. A method as defined in claim 2, wherein, before the second sawing operation, there is introduced into each cleft a granular or powder material so as to fill the cleft over substantially its full extent, the said product constituting the said spacer material.

21. A method as defined in claim 20, wherein the spacer material is sand.

22. A method as defined in claim 21 or claim 20, wherein, before the spacer material is introduced, the open sides of the clefts ae sealed, except for their upper sides.

23. A method as defined in claim 3 or claim 4, including the further step of trimming the pairs of final slabs along their joined edges, so as to remove the said bottom portion which interconnects said slabs.

24. A method as defined in claim 4, wherein the two final slabs of each pair, joined by the hardened binder material, are separated by sub-division or removal of the hardened material.

25. A method as defined in claim 24, wherein before their separation, the final pairs of slabs are cut into smaller slabs.

26. A method as defined in claim 24 or claim 25, wherein, before the separation of the two final slabs, a layer of additional material is fixed to the outer surfaces of said slabs.

27. A method as defined in claim 26, wherein the layer of additional material is a reinforcing layer.

28. A method as defined in claim 26, wherein the layer of additional material is a thermally insulating layer.

29. A method as defined in claim 26, wherein the layer of additional material is a sound absorbent layer.

30. A method as defined in claim 16, wherein the composite slab formed by the final slab and the additional layer is milled to a desired thickness by grinding the outer face of the additional layer.

* * * * *